United States Patent
Suzuki et al.

(10) Patent No.: US 10,855,120 B2
(45) Date of Patent: Dec. 1, 2020

(54) ROTATING ELECTRICAL MACHINE AND PRODUCING METHOD OF ROTATING ELECTRICAL MACHINE

(71) Applicant: KABUSHIKI KAISHA YASKAWA DENKI, Kitakyushu (JP)

(72) Inventors: Takeo Suzuki, Kitakyushu (JP); Kenichi Hirata, Kitakyushu (JP); Hiroshi Koga, Kitakyushu (JP); Motomichi Ohto, Kitakyushu (JP); Yosuke Shirozu, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 111 days.

(21) Appl. No.: 16/052,620

(22) Filed: Aug. 2, 2018

(65) Prior Publication Data

US 2018/0342913 A1    Nov. 29, 2018

Related U.S. Application Data

(63) Continuation of application No. PCT/JP2016/056032, filed on Feb. 29, 2016.

(51) Int. Cl.
*H02K 1/18* (2006.01)
*H02K 1/14* (2006.01)
(Continued)

(52) U.S. Cl.
CPC ............ *H02K 1/14* (2013.01); *H02K 1/148* (2013.01); *H02K 5/00* (2013.01); *H02K 1/185* (2013.01);
(Continued)

(58) Field of Classification Search
CPC .. H02K 1/00; H02K 1/06; H02K 1/14; H02K 1/148; H02K 1/16; H02K 1/18;
(Continued)

(56) References Cited

U.S. PATENT DOCUMENTS 6,487,769 B2 * 12/2002 Ketterer ............... B23P 11/025
                                                        29/596
7,012,350 B2 *  3/2006 Peachee ................ H02K 1/148
                                                        310/166
(Continued)

FOREIGN PATENT DOCUMENTS

CN      104600880 A      5/2015
JP      2005-051941      2/2005
(Continued)

OTHER PUBLICATIONS

Chinese Office Action for corresponding CN Application No. 201680082757.7, dated Oct. 8, 2019.
(Continued)

*Primary Examiner* — Tran N Nguyen
(74) *Attorney, Agent, or Firm* — Mori & Ward, LLP

(57) ABSTRACT

A rotating electrical machine includes a frame, and a stator core fixed to an inner peripheral surface of the frame and including a plurality of split cores disposed in a peripheral direction. Each of the plurality of split cores includes a groove disposed along an axial direction on a central position in the peripheral direction on an outer peripheral surface of the split core, and a first protrusion disposed on a bottom of the groove and protruding outward in a radial direction.

8 Claims, 9 Drawing Sheets

(51) Int. Cl.
*H02K 5/00* (2006.01)
*H02K 15/02* (2006.01)

(52) U.S. Cl.
CPC ....... *H02K 15/022* (2013.01); *H02K 2213/03* (2013.01)

(58) Field of Classification Search
CPC .......... H02K 1/185; H02K 1/27; H02K 1/276; H02K 1/28; H02K 5/00; H02K 15/02; H02K 15/022; H02K 15/024; B23P 11/00; B23P 11/005
See application file for complete search history.

(56) References Cited

U.S. PATENT DOCUMENTS

| | | |
|---|---|---|
| 2009/0134742 A1 | 5/2009 | Rhode |
| 2010/0034674 A1* | 2/2010 | Oota ................. F02M 37/08 417/410.1 |
| 2010/0213788 A1 | 8/2010 | Guttenberger et al. |

FOREIGN PATENT DOCUMENTS

| | | | |
|---|---|---|---|
| JP | 2005-110464 | | 4/2005 |
| JP | 2005110464 | * | 4/2005 |
| JP | 2009-136101 | | 6/2009 |
| WO | WO 2014/128938 A1 | | 8/2014 |
| WO | WO2014128938 | * | 8/2014 |

OTHER PUBLICATIONS

International Search Report for corresponding International Application No. PCT/JP2016/056032, dated May 24, 2016.
Written Opinion for corresponding International Application No. PCT/JP2016/056032, dated May 24, 2016.
Extended European Search Report for corresponding EP Application No. 16892438.9, dated Aug. 9, 2019.
English translation of the Written Opinion for corresponding International Application No. PCT/JP2016/056032, dated May 24, 2016.
Chinese Office Action for corresponding CN Application No. 201680082757.7, dated Jul. 6, 2020.

* cited by examiner

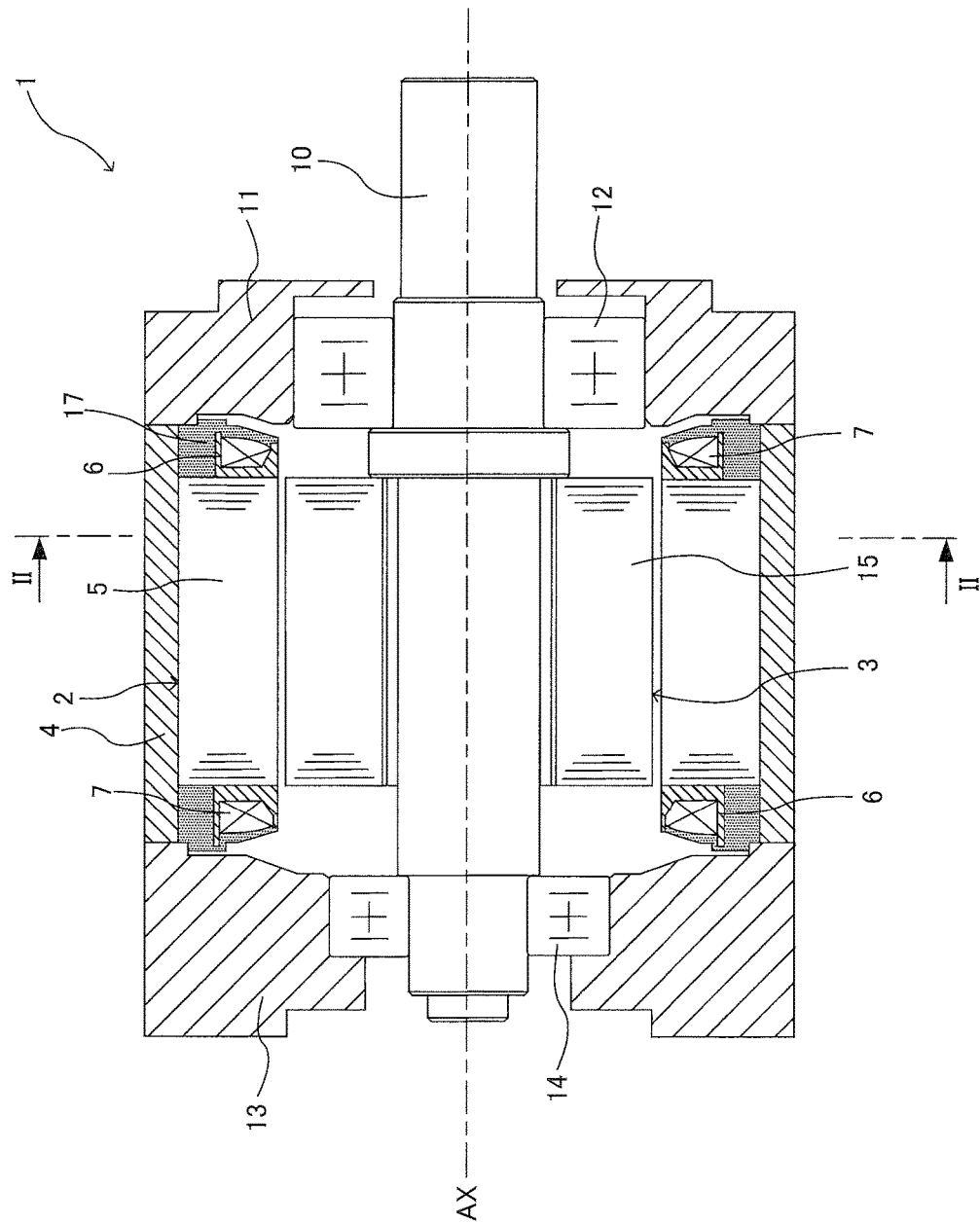
[FIG. 1]

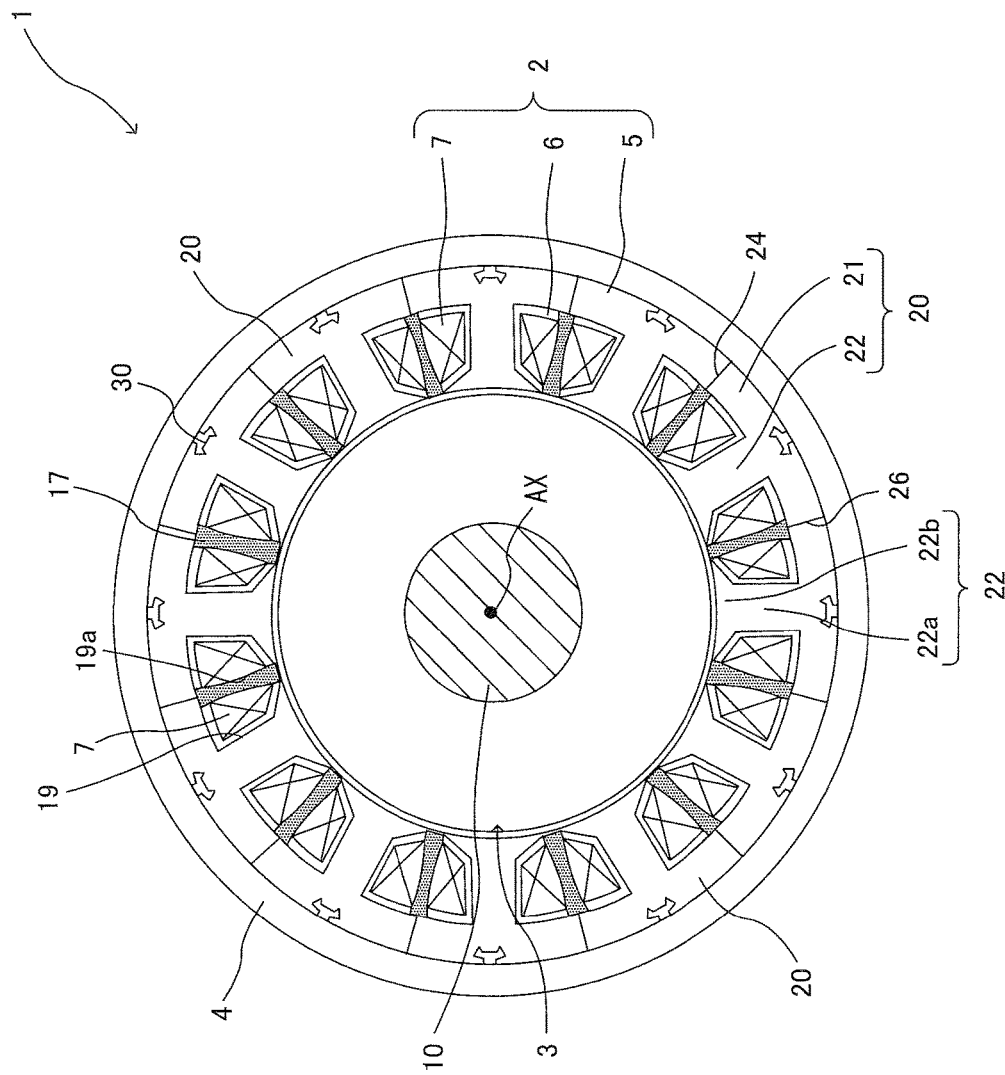
[FIG. 2]

[FIG. 3]
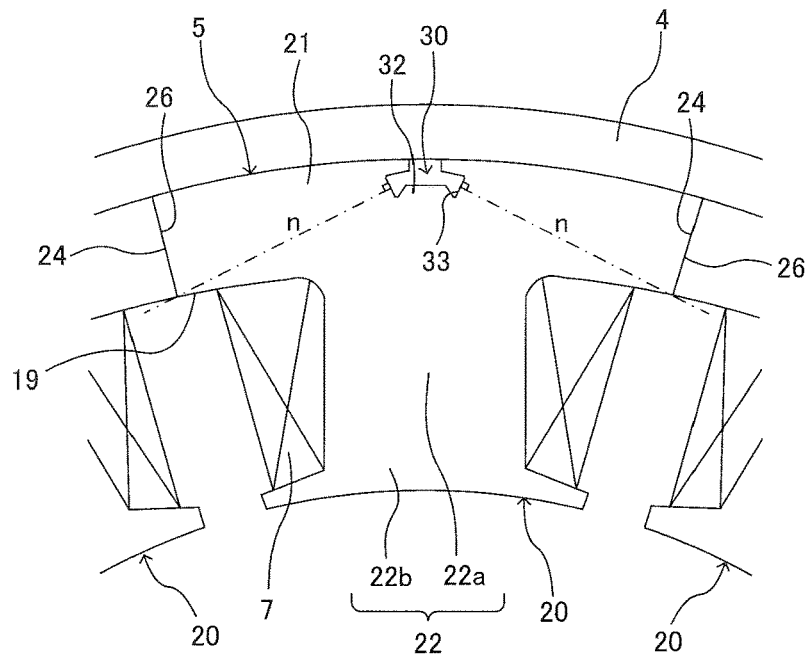
[FIG. 4]
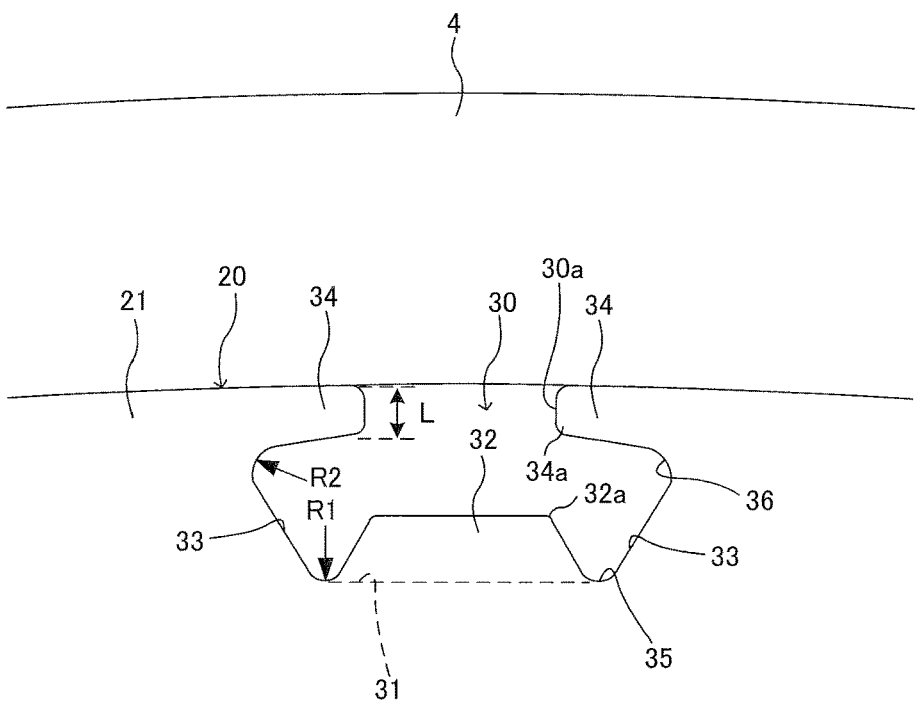

[FIG. 5]
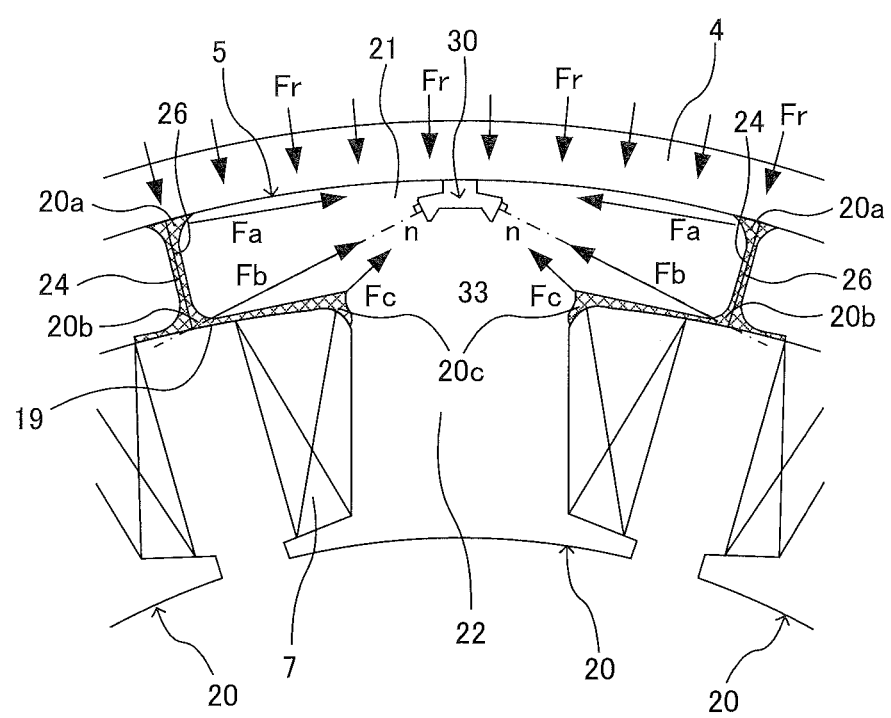

[FIG. 6A]
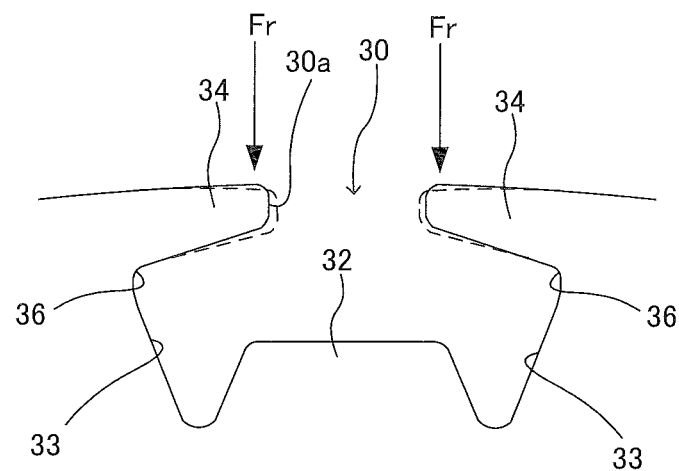
[FIG. 6B]
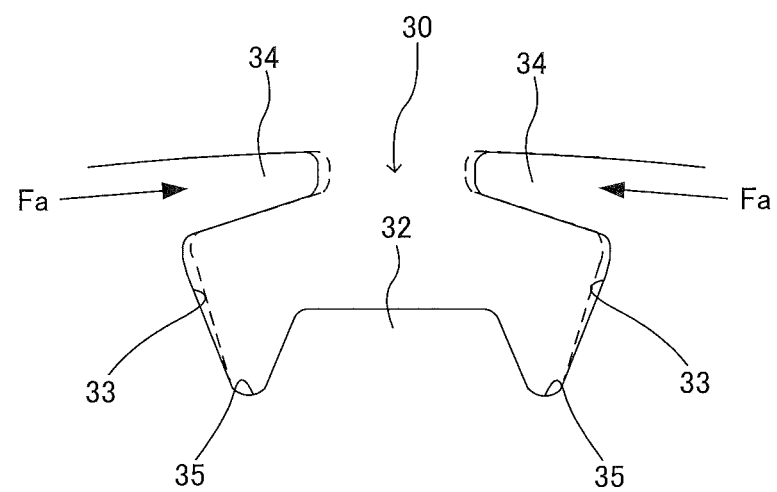

[FIG. 6C]
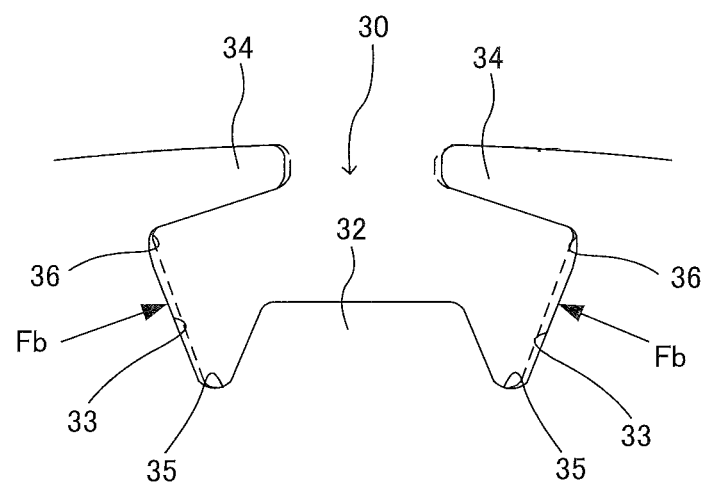
[FIG. 6D]
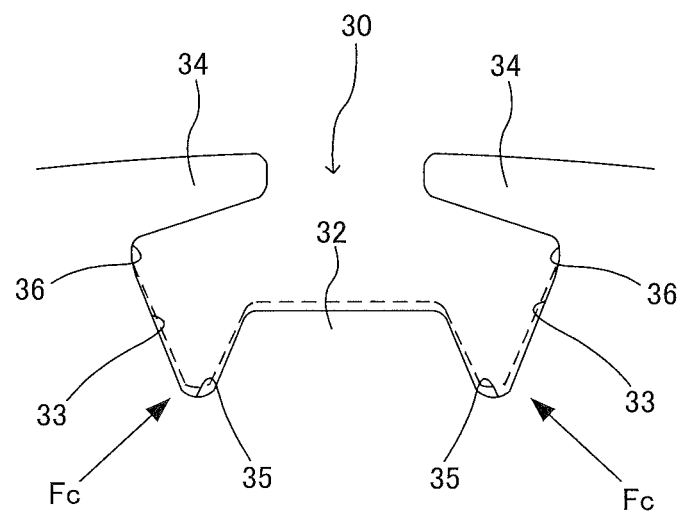

[FIG. 7]
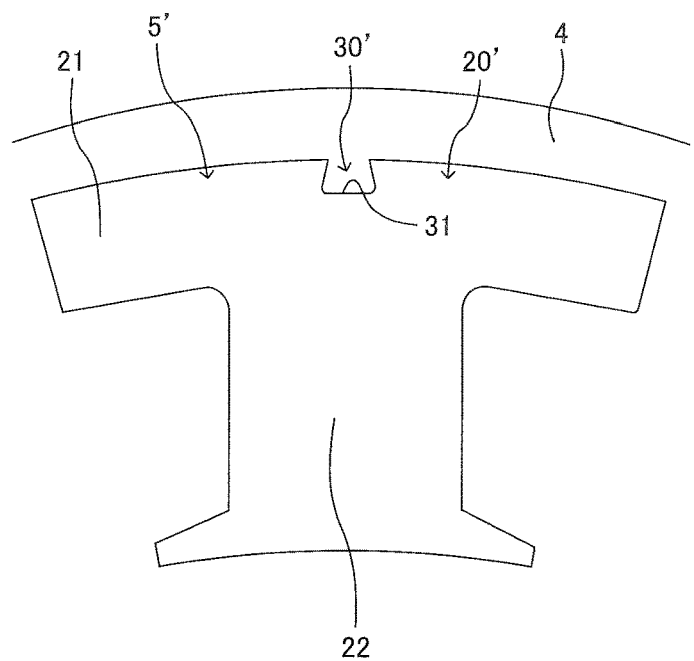
[FIG. 8]
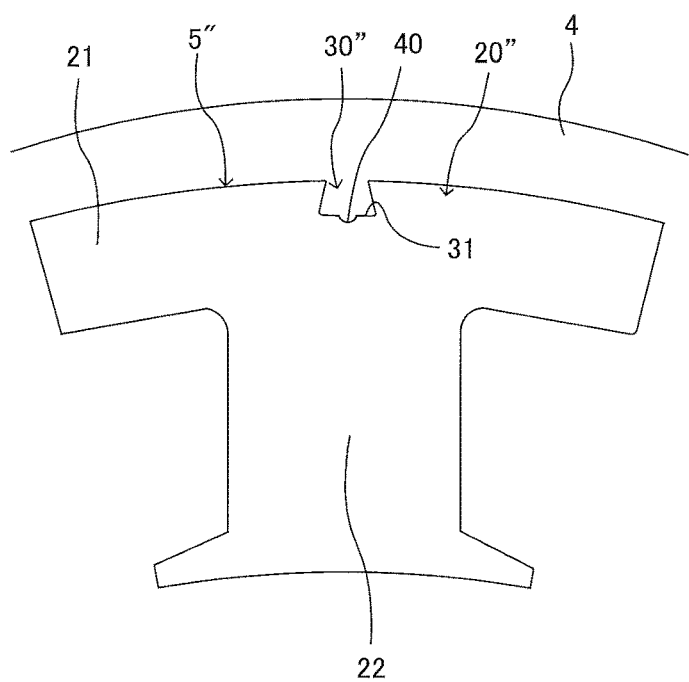

[FIG. 9]
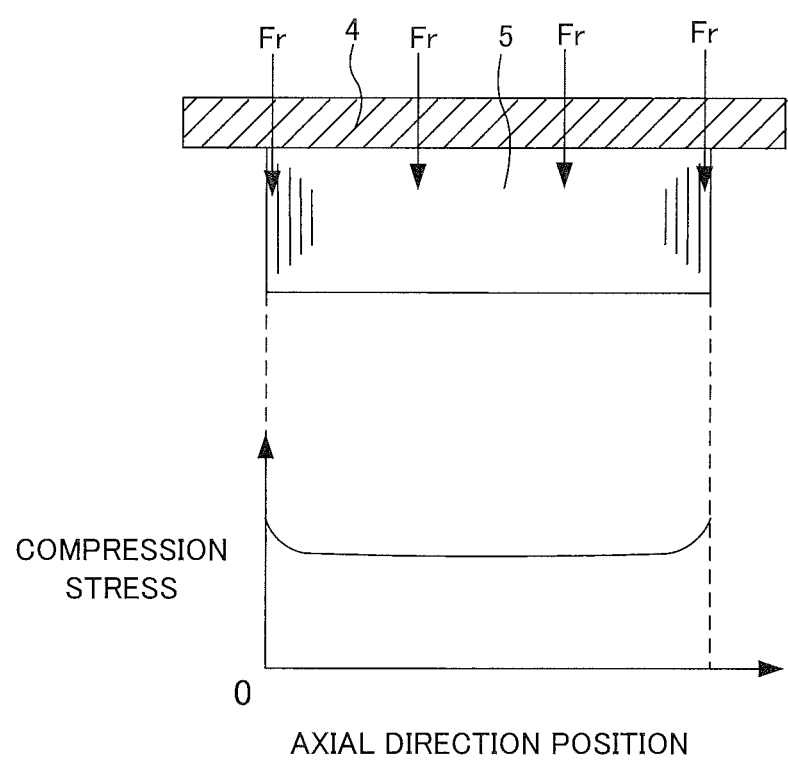

[FIG. 10]
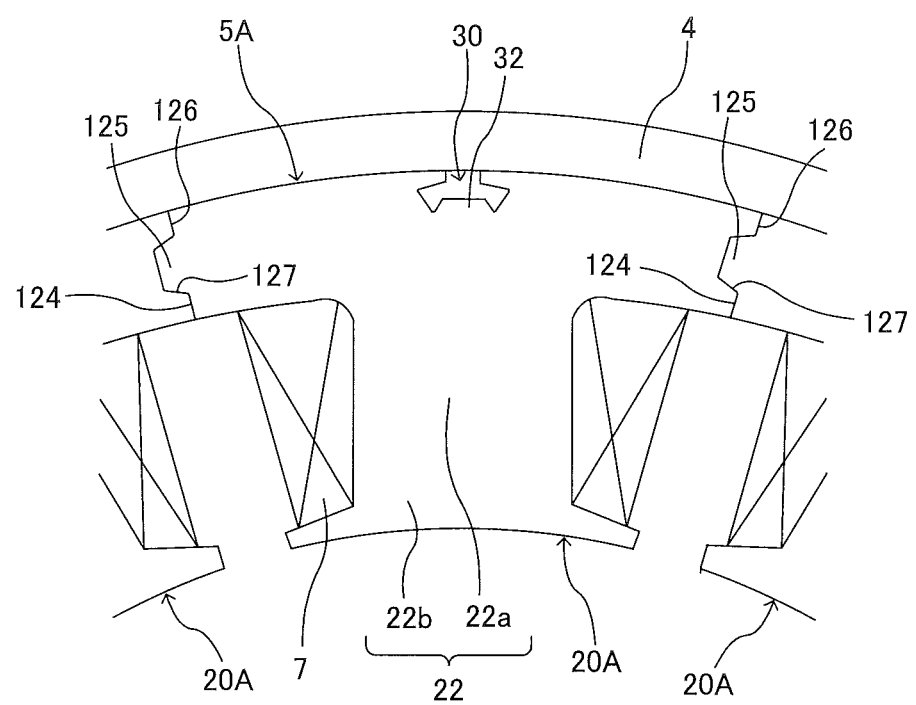

ROTATING ELECTRICAL MACHINE AND PRODUCING METHOD OF ROTATING ELECTRICAL MACHINE

CROSS-REFERENCE TO RELATED APPLICATION

This is a continuation application of PCT/JP2016/056032, filed Feb. 29, 2016, which was published under PCT article 21(2). The entire contents of this application are incorporated herein by reference.

BACKGROUND OF THE INVENTION

Technical Field

The disclosed embodiment relates to a rotating electrical machine and a producing method of the rotating electrical machine.

Description of Background Art

With regard to a rotating electrical machine having a stator core including a plurality of split cores, it is known that occurrence of a large compression stress on the split cores due to shrink fit or press fit on the frame may result in increase of iron loss and decrease of efficiency.

Therefore, in order to mitigate the compression stress of split core, a notch may be disposed at the center of the outer peripheral surface of the split core.

SUMMARY OF THE INVENTION

According to one aspect of the present disclosure, there is provided a rotating electrical machine including a frame, and a stator core fixed to an inner peripheral surface of the frame and including a plurality of split cores disposed in a peripheral direction. Each of the plurality of split cores includes a groove disposed along an axial direction on a central position in the peripheral direction on an outer peripheral surface of the split core, and a first protrusion disposed on a bottom of the groove and protruding outward in a radial direction.

According to another aspect of the present disclosure, there is provided a producing method of a rotating electrical machine including a stator core including a plurality of split cores, each of the plurality of split cores including a groove disposed along an axial direction on an outer peripheral surface of the split core, and a first protrusion disposed on a bottom of the groove and protruding outward in a radial direction. The producing method includes forming the stator core by disposing the plurality of split cores to connect in a peripheral direction, and fixing a frame to an outside of the stator core by shrink fit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an axial cross-sectional view representing an exemplary overall configuration of a rotating electrical machine related to an embodiment;

FIG. 2 is a cross-sectional view of the II-II cross-section of FIG. 1 representing an exemplary overall configuration of the rotating electrical machine;

FIG. 3 is a cross-sectional view representing an exemplary configuration of a split core;

FIG. 4 is a cross-sectional view representing an exemplary cross-sectional shape of a groove disposed on the outer peripheral surface of the split core;

FIG. 5 is an explanatory diagram representing an exemplary compression stress occurring on the split core;

FIG. 6A is an explanatory diagram representing an exemplary groove-induced mitigation effect on compression stress on the split core;

FIG. 6B is an explanatory diagram representing an exemplary groove-induced mitigation effect on compression stress on the split core;

FIG. 6C is an explanatory diagram representing an exemplary groove-induced mitigation effect on compression stress on the split core;

FIG. 6D is an explanatory diagram representing an exemplary groove-induced mitigation effect on compression stress on the split core;

FIG. 7 is a cross-sectional view representing an exemplary configuration of a split core of a comparative example 1;

FIG. 8 is a cross-sectional view representing an exemplary configuration of a split core of a comparative example 2;

FIG. 9 is an explanatory diagram representing an exemplary relation between the compression force acting on the outer peripheral surface of the stator core from a frame and an axial direction position of the stator core; and FIG. 10 is a cross-sectional view representing an exemplary structure of a split core in an exemplary modification in which both end portions of the split core in the peripheral direction are in concave-convex engagement.

DETAILED DESCRIPTION OF THE EMBODIMENTS

In the following, an embodiment will be described, referring to the drawings. Note that, for convenience of explaining the configuration of a rotating electrical machine or the like in the following, although there may be used directions such as top, bottom, right, left, front, back, or the like as appropriate, they are not intended to limit the positional relation of respective components of the rotating electrical machine or the like.

1. Overall Configuration of Rotating Electrical Machine

Referring to FIGS. 1 and 2, an exemplary overall configuration of a rotating electrical machine 1 related to the present embodiment will be described. FIG. 1 is an axial cross-sectional view representing an exemplary overall configuration of the rotating electrical machine 1. FIG. 2, which is a lateral cross-sectional view representing an exemplary overall configuration of the rotating electrical machine 1, illustrates a lateral cross section of the II-II cross-section of FIG. 1.

As illustrated in FIG. 1, the rotating electrical machine 1 includes a stator 2, a rotor 3, a frame 4, a load side bracket 11, and an opposite load side bracket 13. The rotating electrical machine 1 is used as a motor or a generator.

The rotor 3 has a shaft 10, a rotor core 15 disposed on the outer periphery of the shaft 10, and a plurality of permanent magnets (illustration omitted) provided on the rotor core 15. The rotor core 15, which includes a plurality of electromagnetic steel sheets laminated in the axial direction, is provided in a manner facing the stator 2 in the radial direction.

The load side bracket 11 is fixed to the load side of the frame 4 (right side in FIG. 1), whereas the opposite load side bracket 13 is fixed to the side opposite to the load side of the frame 4 (left side in FIG. 1). The shaft 10 is supported in a manner freely rotatable about a rotation axis AX by a load side bearing 12 disposed on the load side bracket 11 and an opposite load side bearing 14 disposed on the opposite load side bracket 13.

Note that "load side" in the present specification refers to a direction in which a load is attached to the rotating electrical machine 1, i.e., the direction in which the shaft 10 protrudes (right side in FIG. 1) in the example, and "opposite load side" refers to a direction opposite to the load side (left side in FIG. 1).

In addition, "axial direction" in the present specification refers to a direction along the rotation axis AX of the shaft 10 (rotor 3), "peripheral direction" refers to a peripheral direction about the rotation axis AX, and "radial direction" refers to a radial direction centered on the rotation axis AX.

The stator 2 is disposed on the inner peripheral surface of the frame 4 in a manner facing the rotor 3 in the radial direction. The stator 2 has a stator core 5 disposed on the inner peripheral surface of the frame 4, a bobbin 6 attached to the stator core 5, and windings 7 wound around the bobbin 6. The bobbin 6 includes insulating material in order to electrically insulate the stator core 5 and the windings 7. Note that the bobbin 6 may be a sheet-shaped insulator.

As illustrated in FIG. 2, the stator core 5 includes a plurality (12 in the illustrated example) of split cores 20 (also referred to as iron core pieces) connected in the peripheral direction. Each of the split cores 20 is formed by laminating, in the axial direction, a plurality of electromagnetic steel sheets formed into a predetermined shape by press punching, for example. The split core 20 has a generally arc-shaped yoke 21 and a tooth 22 integrally disposed on the yoke 21. The tooth 22 has a main body 22a disposed so as to protrude inward from the yoke 21 in the radial direction, and an enlarged-width portion 22b disposed on a tip of the inner periphery of the main body 22a, with the width being enlarged in the peripheral direction. Although, in the example illustrated in FIG. 2, the tips of adjacent ones of the enlarged-width portions 22b are separated in the peripheral direction, they may be in contact with each other.

Each of the split cores 20 has a flat contact surface 24 on one end portion of the yoke 21 in the peripheral direction, and has a flat contact surface 26 being in contact with the contact surface 24 of the split core 20 adjacent to the other end portion in the peripheral direction. A plurality of the split cores 20 are provided in a circular ring shape so that the contact surface 26 of one of the split cores 20 which are adjacent to each other in the peripheral direction abuts the contact surface 24 of the other one of the split cores 20. As a result, the stator core 5 is configured.

After the bobbin 6 and the windings 7 have been attached to the tooth 22, each of the split cores 20 is provided in the peripheral direction so as to form the stator core 5. Then, after the stator core 5 has been fixed to the inner peripheral surface of the frame 4 by press fit or shrink fit, the stator core 5 is molded with resin. As a result, as illustrated in FIG. 1, the stator core 5 (split cores 20), the bobbin 6, and the windings 7 turn out to be fixed by a resin portion 17 made of resin. The outer peripheral surface of each of the split cores 20 has a groove 30 disposed along the axial direction, in order to reduce concentration of stress on the slot 19 or the like in attaching the stator core 5 to the inner peripheral surface of the frame 4 by shrink fit or the like.

As illustrated in FIG. 2, the windings 7 attached to each of the teeth 22 is received in a slot 19 between the teeth 22 which adjacent to each other in the peripheral direction, and the side portions facing each other of the winding layer of the windings 7 are provided in a manner spaced apart by a gap 19a. Resin is press fit into the gap 19a at the time of molding, whereby the resin portion 17 is filled.

Note that the resin portion 17 is not always required, and there may be a configuration such that the stator core 5 (split cores 20), the bobbin 6, and the windings 7 are not integrated by resin.

2. Cross-Sectional Shape of Groove of Split Core

Referring to FIGS. 3 and 4, an exemplary cross-sectional shape (cross-sectional shape perpendicular in the axial direction) of the groove 30 of the split core 20 will be described. Note that, in FIG. 3, illustration of the bobbin 6 and the resin portion 17 is omitted (similarly to FIGS. 5 and 10 described below).

As illustrated in FIGS. 3 and 4, the groove 30 is disposed along the axial direction on a generally central position in the peripheral direction of the outer peripheral surface of the split core 20. The groove 30 has an aperture 30a open toward the inner peripheral surface of the frame 4.

As illustrated in FIG. 4, the split core 20 has a first protrusion 32 on a bottom 31 of the groove 30. The first protrusion 32 protrudes outward in a generally trapezoid shape from the bottom 31 in the radial direction. Note that the shape of the first protrusion 32 is not limited to the shape of a trapezoid, and may be rectangular or arc-shaped, for example. In addition, the groove 30 has two side surfaces 33 disposed in a manner facing each other in the peripheral direction. The two side surfaces 33 are disposed in a manner inclined by a predetermined angle relative to the radial direction so that the groove width in the peripheral direction decreases inward in the radial direction. As a result, the side surfaces 33 face toward the direction of the end portions of the contact surfaces 24 and 26 at the side of the slots. Specifically, as illustrated in FIG. 3, the side surfaces 33 are disposed so that a normal n perpendicular to the side surfaces 33 passes the vicinity of an inner end portion in the radial direction on the contact surfaces 24 and 26.

In addition, the groove 30 has two second protrusions 34 being in contact with the inner peripheral surface of the frame 4. The two second protrusions 34 are disposed in a manner protruding in a mutually approaching direction from the outer end portion of each of the two side surfaces 33 in the radial direction.

In addition, the groove 30 has two acute-angled first notches 35 and two acute-angled second notches 36. The two first notches 35 are respectively disposed between the first protrusion 32 and the two side surfaces 33. The second notches 36 are respectively disposed between the two side surfaces 33 and the two second protrusions 34.

As illustrated in FIG. 4, the first notch 35 and the second notch 36 have a shape such that a cross-sectional shape perpendicular in the axial direction is chamfered into an arc-like shape.

In the present embodiment, when letting t be the plate thickness of a steel sheet forming the split core 20, the radius of curvature R1 of the first notch 35 is set to be smaller than the plate thickness t, and the radius of curvature R2 of the second notch 36 to be larger than the plate thickness t. For example, when the plate thickness t of the steel sheet is 0.35 mm, the radius of curvature R1 of the first notch 35 is set to 0.3 mm, and the radius of curvature R2 of the second notch 36 to 0.4 mm. In addition, the thickness L along the radial direction of the second protrusion 34 is set to be, for example, two times or more than the plate thickness t (0.7 mm or more in the example), considering the precision of the shape in punching the steel sheet.

Note that corners 32a on both sides of the first protrusion 32 in the peripheral direction and corners 34a outside and inside the tip portion of the second protrusion 34 in the radial direction also have a shape chamfered into an arc-like shape with an appropriate radius of curvature.

3. Groove-Induced Mitigation Effect on Compression Stress on Split Core

Referring to FIG. 5 and FIGS. 6A-6D, an exemplary mitigation effect induced by the groove 30 against the compression stress on the split cores 20 will be described. Note that the region indicated by hatching in FIG. 5 illustrates a region where the compression stress is relatively high (region where the stress is higher than a predetermined value).

As illustrated in FIG. 5, fixing the stator core 5 to the frame 4 by shrink fit, press fit, or the like causes an inward compression force Fr in the radial direction to act on each of the split cores 20 due to clamping from the frame 4, whereby a compression stress occurs on each of the split cores 20. The compression stress becomes relatively high particularly in the vicinity of a corner 20a of the contact surfaces 24 and 26 at the side of the frame 4 being in contact with the split cores 20 adjacent thereto, a corner 20b at the side of the slot 19, and a nook 20c between the yoke 21 and the tooth 22, all of which belonging to both ends of the split cores 20 in the peripheral direction. The groove 30, receiving and absorbing compression stress from respective directions in the split cores 20, efficiently receives and absorbs compression stresses Fa, Fb and Fc from directions of positions with the relatively high compression stress (corner 20a, corner 20b, and nook 20c) particularly, thereby mitigating compression stress occurring on the split cores 20. In the following, details of the mitigation effect induced by the groove 30 against respective forces will be described.

(3-1. Mitigation Effect on Compression Force Fr)

Generally, in the rotating electrical machine 1, unevenness of the inner diameter or the thickness of the frame 4, unevenness of the outer diameter of the split core 20, or the like causes unevenness in the compression force Fr acting on the outer peripheral surface of the stator core 5 from the frame 4. The unevenness of the compression force Fr causes non-uniform compression stress, distortion, or the like in the split cores 20, which may be a cause of increase of iron loss.

In the present embodiment, as indicated by the dotted line in FIG. 6A, with regard to the compression force Fr from the frame 4, the two second protrusions 34 disposed in a manner contacting the inner peripheral surface of the frame 4 bend inward in the radial direction in accordance with the compression force Fr, with the base portion (joint with the side surface 33, i.e., the second notch 36) being the fulcrum. As a result, unevenness of the compression force Fr from the frame 4 is mitigated. On this occasion, the second notch 36 disposed between the side surface 33 and the second protrusion 34 acts as a spring that causes the second protrusion 34 to bend toward the side surface 33. As a result, bending of the second protrusion 34 inward in the radial direction by the compression force Fr is enhanced, whereby the effect of mitigating the unevenness of the compression force Fr is increased.

(3-2. Mitigation Effect on Compression Stress Fa)

As indicated by the dotted line in FIG. 6B, among the compression stresses acting on the groove 30 from respective directions, particularly with regard to the compression stress Fa from the direction of the corner 20a of the contact surfaces 24 and 26 at the side of the frame 4, the compression stress Fa is effectively absorbed by the two second protrusions 34 and the two side surfaces 33 bending inward of the groove 30 with the first notch 35 being the fulcrum. On this occasion, the two first notches 35 disposed between the first protrusion 32 and the two side surfaces 33 act as a spring that causes the side surfaces 33 to bend toward the first protrusion 32. As a result, bending of the second protrusions 34 and the side surface 33 by the compression stress Fa is enhanced, whereby the effect of mitigating the unevenness of the compression force Fa is increased.

(3-3. Mitigation Effect on Compression Stress Fb)

As indicated by the dotted line in FIG. 6C, among the compression stresses acting on the groove 30 from respective directions, particularly with regard to the compression stress Fb from the direction of the corner 20b on the side of a slot 19 of the contact surfaces 24 and 26, the compression stress Fb is effectively absorbed by the two second protrusions 34 and the two side surfaces 33 bending inward of the groove 30 with the first notch 35 being the fulcrum, similarly to the compression stress Fa. On this occasion, as described above, the normal n of the side surfaces 33 is set to pass the vicinity of the end portion at the side of the slot of the contact surfaces 24 and 26, whereby the direction of the two side surfaces 33 turns out to be generally orthogonal relative to the compression stress Fb, and therefore the absorption effect on the compression stress Fb by the side surfaces 33 is particularly increased.

(3-4. Mitigation Effect on Compression Stress Fc)

As indicated by the dotted line in FIG. 6D, among the compression stresses acting on the groove 30 from respective directions, particularly with regard to the compression stress Fc from the direction of nook 20c between the yoke 21 and the tooth 22, compression stress Fc is effectively absorbed by the two side surfaces 33 receiving the compression stress Fc and therefore bending inward of the groove 30, and also by the first protrusion 32 receiving the compression stress Fc and therefore bending in a manner moving outward in the radial direction. On this occasion, the second notch 36 acts as a spring that causes the side surfaces 33 to bend inward relative to the second protrusion 34, and the first notch 35 acts as a spring that varies the angle between the first protrusion 32 and the side surfaces 33 so as to cause the first protrusion 32 to bend outward. As a result, bending of the two side surfaces 33 by the compression stress Fc and bending of the first protrusion 32 are enhanced, whereby the absorption effect on the compression stress Fc is increased.

Note that, when the groove 30 receives the compression stresses Fa, Fb and Fc from both sides in the peripheral direction as described above, the first protrusion 32 acts in a manner enduring the compression stresses. As a result, it is possible to suppress occurrence of local stress concentration on the bottom 31 of the groove 30, while mitigating compression stress occurring on the split cores 20 all over the groove 30.

4. Producing Method of Rotating Electrical Machine

The rotating electrical machine 1 of the present embodiment is assembled generally in the following manner. After the bobbin 6 and the windings 7 have been attached to the tooth 22, each of the split cores 20 is provided in a manner connected in the peripheral direction so as to form the stator core 5. Then, the stator core 5 is fixed to the inside of the frame 4 by press fit, shrink fit, or the like. Subsequently, the stator core 5 and, the plurality of windings 7, or the like, attached to the stator core 5 are integrated in the resin portion 17. In this manner, the stator 2 is assembled.

Next, the load side bracket 11 having the shaft 10 installed therein is fixed to the load side of the frame 4, while inserting the shaft 10 and the rotor 3 inside the stator 2. Then, the opposite load side bracket 13 is fixed to the opposite load side to the load of the frame 4, while press fitting the shaft 10 to the opposite load side bearing 14. As a result, assembly of the rotating electrical machine 1 is completed. Note that the order of assembling the load side bracket 11 and the opposite load side bracket 13 may be reversed.

5. Groove Shape and Problem of Comparative Example

Before describing the effect exerted by the present embodiment described above, the groove shape and a problem of a comparative example will be described.

As illustrated in FIG. 7, a stator core 5' of a comparative example 1 has a groove 30' disposed on the central position of the outer peripheral surface of each of the split cores 20' in the peripheral direction, the groove having a shape whose width in the peripheral direction is enlarging inward in the radial direction (isosceles trapezoid shape, i.e., the so-called dovetail groove shape). In such a case, non-uniform compression stress or distortion is likely to occur on the split cores 20 by unevenness of the compression force Fr due to unevenness of the inner diameter or the thickness of the frame 4, unevenness of the outer diameter of the split core 20, or the like. In addition, the bottom 31 particularly endures the compression stress Fb from the direction of the corner 20b or the compression stress Fc from the direction of nook 20c, among the compression stresses acting on the groove 30' from respective directions, whereby the absorption effect is low. In other words, the mitigation effect on the compression stress occurring on the split core 20' is not sufficient.

On the other hand, as illustrated in FIG. 8, a stator core 5" of a comparative example 2 has a second groove 40 disposed on the bottom 31 of a groove 30" of each of the split cores 20". The second groove 40 allows for reducing the enduring action of the bottom 31, and thereby increasing the absorption effect on the compression stresses Fb and Fc. However, there is a possibility that compression stress may concentrate locally on the position of the second groove 40, whereby the stress concentration may obstruct the magnetic flux passing through the yoke 21.

In addition, as illustrated in FIG. 9, the compression force Fr (compression stress) acting on the outer peripheral surface of the stator core 5 from the frame 4 becomes large in the vicinity of the end portion in the lamination direction (axial direction) of the stator core 5. As a result, when the compression force Fr is large, there is a possibility that the steel sheet in the vicinity of the end portion in the lamination direction may bend outward in the axial direction on the position of the second groove 40 due to local stress concentration, and separate from the split core 20".

6. Effect of Embodiments

According to the present embodiment, the problems of the comparative example 1 and the comparative example 2 can be solved. In other words, in the present embodiment, the bottom 31 of the groove 30 has disposed thereon the first protrusion 32 protruding outward in the radial direction. The first protrusion 32 acts in a manner enduring the compression stresses Fa, Fb and Fc when the groove 30 receives them from both sides in the peripheral direction, and allows for suppressing occurrence of local stress concentration on the bottom 31 as with the case of the comparative example 2. On the other hand, as a result of disposing the first protrusion 32 on the bottom 31, it turns out that a recess (first notch 35) is formed between the first protrusion 32 and the side surfaces 33 and the bending of the groove 30 due to the recess allows for increasing the effect of absorbing the compression stresses Fb, Fc, or the like in comparison with the comparative example 1. As described above, it is possible to suppress occurrence of local stress concentration, while mitigating the compression stress occurring on the split cores 20 all over the groove 30. As a result, it is possible to decrease the influence on the magnetic flux passing through the yoke 21 and to prevent separation of the steel sheet in the vicinity of the end portion in the lamination direction.

In addition, particularly in the present embodiment, the groove 30 has two side surfaces 33 disposed in the peripheral direction in a manner facing each other, so that the groove width in the peripheral direction decreases inward in the radial direction.

As a result, it is possible to face the side surfaces 33 of the groove 30 toward the side of the slot 19 of the contact surfaces 24 and 26. As a result, it is possible to receive and absorb, by the two side surfaces 33, the compression stress Fb particularly from the direction of the corner 20b on the side of the slot 19 of the contact surfaces 24 and 26, among the compression stresses acting on the groove 30.

In addition, particularly in the present embodiment, the groove 30 has the two second protrusions 34 contacting the inner peripheral surface of the frame 4 and disposed in a manner protruding in a mutually approaching direction from the outer end portion of each of the two side surfaces 33 in the radial direction.

As a result, the two second protrusions 34 can bend in accordance with the compression force Fr from the frame 4, with the base portion (joint with the side surface 33) being the fulcrum. As a result, it is possible to mitigate the unevenness of the compression force Fr from the frame 4, and to suppress occurrence of uneven compression stress, distortion, or the like on the split cores 20.

In addition, the second protrusion 34 allows for narrowing the width of the aperture 30a so as to increase the contact area between the inner peripheral surface of the frame 4 and the outer peripheral surface of the split core 20 in comparison with the comparative example 1 and the comparative example 2. As a result, it is possible to secure a heat conduction area that turns out to be the main path for dissipating the heat of the stator 2, whereby heat dissipation performance can be improved.

In addition, particularly in the present embodiment, the groove 30 has the two acute-angled first notches 35 respectively disposed between the first protrusion 32 and the two side surfaces 33. As a result, the following effect is exhibited.

In other words, the first notch 35 acts as a spring that varies the angle between the first protrusion 32 and the side surface 33 (causes the side surface 33 to bend against the first protrusion 32) in accordance with the compression stress acting on the groove 30. As a result, it is possible to effectively absorb the compression stresses Fa, Fb and Fc acting on the groove 30.

In addition, compression forces acting on the contact surfaces 24 and 26 on both ends of the split cores 20 are respectively different due to unevenness of the inner diameter or the thickness of the frame 4, unevenness of the outer diameter of the split core 20, or the like. In the groove 30, the first notch 35 is disposed on both sides of the first protrusion 32 in the peripheral direction, and therefore it is possible to absorb different compression stresses acting from both sides in the peripheral direction in accordance with the strength thereof. As a result, even when local stress concentration has occurred on the split cores 20, it is possible to prevent the concentrated stress from spreading all over the plurality of the split cores 20 provided in a circular ring shape in the peripheral direction. As a result, it is possible to equalize the compression stress on each of the split cores 20.

In addition, particularly in the present embodiment, the groove 30 has the two acute-angled second notches 36 respectively disposed between the two side surfaces 33 and the two second protrusions 34. As a result, the following effect is exhibited.

In other words, the second notch 36 acts as a spring that varies the angle between the second protrusion 34 and the side surface 33 (causes the second protrusion 34 to bend against the side surface 33) in accordance with the compression force Fr acting on the second protrusion 34 from the frame 4. As a result, it is possible to increase the effect of mitigating the unevenness of the compression force Fr from the frame 4, and to suppress occurrence of uneven compression stress, distortion, or the like on the split cores 20. In addition, it is possible to vary the angle between the second protrusion 34 and the side surfaces 33 particularly when the compression stress Fc is acting on the groove 30, and absorb the compression stress Fc.

In addition, particularly in present embodiment, the split core 20 is formed by laminating a plurality of steel sheets, the first notch 35 and the second notch 36 have a shape such that the cross-sectional shape perpendicular to the axial direction is chamfered into an arc-like shape, with the radius of curvature R1 of the first notch 35 being smaller than the plate thickness t of the steel sheet, and the radius of curvature R2 of the second notch 36 being larger than the plate thickness t of the steel sheet.

As a result, it is possible to increase the spring action by the first notch 35 to be stronger than the spring action by the second notch 36. As a result, it is possible to increase the absorption effect on the compression stresses Fa, Fb, or the like, while maintaining the stiffness of the second protrusion 34 equal to or larger than a predetermined degree. In this manner, it is possible to render the shape of the groove 30 into a shape which is optimal for absorbing compression stresses in accordance with the strength of the compression stresses acting from respective directions, and to increase the absorption effect.

In addition, particularly in the present embodiment, the split cores 20 respectively have, on the end portions of both sides in the peripheral direction, the contact surfaces 24 and 26 being in contact with the split cores 20 adjacent thereto, and the side surface 33 is disposed so that the normal n perpendicular to the side surface 33 passes the vicinity of the inner end portions of the contact surfaces 24 and 26 in the radial direction.

As a result, it is possible to face the side surface 33 of the groove 30 toward the end portions of the contact surfaces 24 and 26 on the slot side, whereby it is possible to increase the effect of absorbing, among the compression stresses acting on the groove 30, particularly the compression stress Fb from the direction of the corner 20b of the contact surfaces 24 and 26 on the slot side.

7. Modification Example

Note that the disclosed embodiments are not limited to those described above, and various types of modification are possible in a range that does not deviate from the scope and technical concept thereof.

Although the embodiments have described a case in which the end portions of both sides of the split cores 20 in the peripheral direction are the flat contact surfaces 24 and 26, the split cores may be in concave-convex engagement with each other. In other words, each of the split cores may have a protrusion on the contact surface of the end portion of one side in the peripheral direction, and a recess that engages with the protrusion of the split core adjacent thereto on the contact surface of the end portion of the other side in the peripheral direction. An example of the modification is illustrated in FIG. 10.

As illustrated in FIG. 10, the split core 20A of the modification example has a protrusion 125 on a contact surface 124 of the end portion of one side in the peripheral direction, and a recess 127 that engages with the protrusion 125 of the split core 20A adjacent thereto, on the contact surface 126 of the end portion of the other side in the peripheral direction. The protrusion 125 has a cross-sectional shape (cross-sectional shape perpendicular to axial direction) which is a tapered shape (may be trapezoid or triangular in this example) whose width in the radial direction becomes smaller toward the tip of one side in the peripheral direction. The recess 127 has a cross-sectional shape corresponding to the shape of the protrusion 125, i.e., shape such that the aperture width in the radial direction becomes smaller toward the tip of one side in the peripheral direction. The stator core 5A is formed by engaging the recess 127 of one of the split cores 20A of the split cores 20A adjacent to each other in the peripheral direction with the protrusion 125 of the other of the split cores 20A, and coupling each other in the peripheral direction.

Note that configuration of the split cores 20A other than those described above is similar to those of the split cores 20 illustrated in FIG. 3, and explanation thereof is omitted. The modification example also exhibits a similar effect to that of the embodiments described above.

It is noted that if terms "vertical," "parallel," "plane," etc. are used in the above description, these terms are not used in the exact meanings thereof. Specifically, these terms "vertical," "parallel," and "plane" allow tolerances and errors in design and producing and have meanings of "approximately vertical," "approximately parallel," and "approximately plane."

It is noted that if terms "same," "equal," "different," etc. in relation to a dimension, a size, a shape and a position of the appearance are used in the above description, these terms are not used in the exact meaning thereof. Specifically, these terms "same," "equal," and "different" allow tolerances and errors in design and producing and have meanings of "approximately the same," "approximately equal," and "approximately different."

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

What is claimed is:

1. A rotating electrical machine comprising:
a frame; and
a stator core fixed to an inner peripheral surface of the frame and comprising a plurality of split cores disposed in a peripheral direction, each of the plurality of split cores comprising:
an outer peripheral surface contacting the inner peripheral surface of the frame,
a groove disposed along an axial direction on a central position in the peripheral direction on the outer peripheral surface; and
a first protrusion disposed on a bottom of the groove and protruding outward in a radial direction,
wherein the groove comprises two side surfaces facing each other in the peripheral direction,
wherein a groove width between the two side surfaces in the peripheral direction decreases inward in the radial direction,
wherein the groove comprises two second protrusions contacting the inner peripheral surface of the frame and protruding in a mutually approaching direction from an outer end portion of each of the two side surfaces in the radial direction such that a contact area between the inner peripheral surface of the frame and the outer peripheral surface of the split core increases,
wherein the groove comprises two first notches respectively disposed between the first protrusion and the two side surfaces,
wherein each of the two first notches is formed to be an acute angle,
wherein the groove comprises two second notches respectively disposed between the two side surfaces and the two second protrusions, and
wherein each of the two second notches is formed to be an acute angle.

2. The rotating electrical machine according to claim 1,
wherein the split core is formed by laminating a plurality of steel sheets,
wherein cross sectional shapes of the first notch and the second notch perpendicular to the axial direction are chamfered into an arc shape,
wherein a radius of curvature of the first notch is smaller than a plate thickness of the steel sheet, and
wherein a radius of curvature of the second notch is larger than the plate thickness of the steel sheet.

3. The rotating electrical machine according to claim 1,
wherein the split core comprises two contact surfaces respectively being in contact with adjoining two split cores on end portions of both sides in the peripheral direction, and
wherein the side surface is disposed such that a normal perpendicular to the side surface passes vicinity of an inner end portion of the contact surface in the radial direction.

4. The rotating electrical machine according to claim 2,
wherein the split core comprises two contact surfaces respectively being in contact with adjoining two split cores on end portions of both sides in the peripheral direction, and
wherein the side surface is disposed such that a normal perpendicular to the side surface passes vicinity of an inner end portion of the contact surface in the radial direction.

5. A rotating electrical machine, comprising:
a frame; and
a stator core fixed to an inner peripheral surface of the frame and comprising a plurality of split cores disposed in a peripheral direction, each of the plurality of split cores comprising:
a groove disposed along an axial direction on a central position in the peripheral direction on an outer peripheral surface of the split core; and
a first protrusion disposed on a bottom of the groove and protruding outward in a radial direction,
wherein the groove comprises two side surfaces facing each other in the peripheral direction,
wherein a groove width between the two side surfaces in the peripheral direction decreases inward in the radial direction,
wherein the groove comprises two second protrusions contacting the inner peripheral surface of the frame and protruding in a mutually approaching direction from an outer end portion of each of the two side surfaces in the radial direction,
wherein the groove comprises two first notches respectively disposed between the first protrusion and the two side surfaces,
wherein each of the two first notches is formed to be an acute angle,
wherein the groove comprises two second notches respectively disposed between the two side surfaces and the two second protrusions, and
wherein each of the two second notches is formed to be an acute angle.

6. The rotating electrical machine according to claim 5,
wherein the split core is formed by laminating a plurality of steel sheets,
wherein cross sectional shapes of the first notch and the second notch perpendicular to the axial direction are chamfered into an arc shape,
wherein a radius of curvature of the first notch is smaller than a plate thickness of the steel sheet, and
wherein a radius of curvature of the second notch is larger than the plate thickness of the steel sheet.

7. The rotating electrical machine according to claim 5,
wherein the split core comprises two contact surfaces respectively being in contact with adjoining two split cores on end portions of both sides in the peripheral direction, and
wherein the side surface is disposed such that a normal perpendicular to the side surface passes vicinity of an inner end portion of the contact surface in the radial direction.

8. The rotating electrical machine according to claim 6,
wherein the split core comprises two contact surfaces respectively being in contact with adjoining two split cores on end portions of both sides in the peripheral direction, and
wherein the side surface is disposed such that a normal perpendicular to the side surface passes vicinity of an inner end portion of the contact surface in the radial direction.

* * * * *